US006280075B1

(12) United States Patent
Cadeo

(10) Patent No.: US 6,280,075 B1
(45) Date of Patent: Aug. 28, 2001

(54) SYSTEM FOR CONTINUOUSLY PREPARING AT LEAST TWO DIFFERENT LIQUID FOODSTUFF MIXTURES

(75) Inventor: Angelo Cadeo, Rothrist (CH)

(73) Assignee: Angelo Cadeo and Miteco AG, Zofingen (CH)

( * ) Notice: Subject to any disclaimer, the term of this patent is extended or adjusted under 35 U.S.C. 154(b) by 0 days.

(21) Appl. No.: 09/667,267

(22) Filed: Sep. 22, 2000

(51) Int. Cl.[7] ............................... A23L 1/00; A23L 2/52; A23L 2/54; B01F 15/04; B01F 15/00

(52) U.S. Cl. ....................... 366/132; 366/159.1; 366/348; 366/601; 99/348; 99/409

(58) Field of Search ............................ 99/287, 348, 409, 99/359; 366/132, 137, 159.1, 160.2, 181.8, 182.2, 152.1, 142, 181.5, 182.4, 348, 601; 73/304 R, 1.31

(56) References Cited

U.S. PATENT DOCUMENTS

| | | | | |
|---|---|---|---|---|
| 3,608,869 | * | 9/1971 | Woodle | 366/159.1 |
| 4,260,739 | * | 4/1981 | Geyer, Jr. et al. | 99/348 X |
| 4,378,335 | * | 3/1983 | Boden et al. | 366/137 |
| 4,635,825 | * | 1/1987 | Tulasne | 366/177.1 |
| 4,673,296 | * | 6/1987 | Sjogren | 99/348 X |
| 4,854,713 | * | 8/1989 | Soechtig | 366/132 |
| 4,964,732 | | 10/1990 | Cadeo . | |

FOREIGN PATENT DOCUMENTS

| | | |
|---|---|---|
| 3101 490 | 7/1982 | (DE) . |
| 0 678 735 | 10/1995 | (EP) . |

* cited by examiner

*Primary Examiner*—Timothy F. Simone
(74) *Attorney, Agent, or Firm*—Shenier & O'Connor

(57) ABSTRACT

Storage containers (4, 14) located in a first supply station (1) are provided for mixed constituents which are characteristic of a first product. Outflow lines (8, 18) which can be closed run out of the storage containers (4, 14) via first closing devices (61, 62). A second set of storage containers (24, 34) located in a second supply station (2) are provided for mixed constituents which are characteristic of an additional product. Second outflow lines (48, 58, 68) which can be closed run out of the second set of storage containers (24, 34) via second closing devices (63, 70). Storage containers (44, 54, 64) located in the third supply station (3) are provided for mixed constituents which are available in both products to be produced. Outflow lines (48, 58, 68) are permanently open when the system is in operation. The first outflow lines (8, 18) communicate with the outflow lines (48, 58, 68) of the third supply station (3) via a transport line (20) having a stop valve (21). The additional outflow lines (28, 38) communicate with the outflow lines of the third supply station (3) via a transport line (22) having a second stop valve (23).

15 Claims, 2 Drawing Sheets

SYSTEM FOR CONTINUOUSLY PREPARING AT LEAST TWO DIFFERENT LIQUID FOODSTUFF MIXTURES

CROSS REFERENCE TO RELATED APPLICATIONS

This application claim the priority of the Swiss patent application No. 703/98, which has been filed on Mar. 25, 1998 and the disclosure of which is herewith incorporated by reference.

1. Field of the Invention

The present invention relates to a system for continuously preparing at least two different liquid foodstuff mixtures of which each consists of a mixture of several liquid mixture components and includes at least one mixture component which is common to all mixtures, which plant is intended to be connected to continuously operating filling apparatuses for the liquid foodstuff liquids.

These liquid foodstuff mixtures may be for instance directly consumable beverages, with or without $CO_2$, may however, be also present in form of a so-called syrup which such as known for several kinds of beverages, is skipped in barrels to the end user such to be diluted with water and possibly mixed with $CO_2$ only immediately prior to the dispensing. Furthermore, such liquid foodstuff mixtures may be present in form of a cream, for instance of a milk product.

2. Prior Art

Such liquid foodstuff mixtures consist generally of at least two mixture components. In case of beverages one of the mixture components may be the component which determines the flavor, the property of the final product and which is often present as a concentrate, and the other of the mixture components may be water, in certain cases a concentrated sugar solution or a liquid sweetener.

The mentioned flavor imparting concentrate is often a mixture, which consists of several mixture components. The mentioned other of the mixture components, which in several cases can be a mixture itself, is added to the concentrate mixture. The other mixture component may, thus, be at the one hand merely (obviously treated) water, at the other hand for instance a mixture of water and a concentrated sugar solution.

In larger plants for the production of liquid foodstuff mixtures a plurality of different products a produced simultaneously, which are filled into bottles, cans or into barrels.

Plants exist, thereby, in which different liquid foodstuff mixtures are produced, may there be in form of ready to drink beverages to be filled into bottles or cans, or in form of not yet finally diluted syrups which are filled into barrels, which mixtures all include the mixture components which are common to all.

For instance, one of the liquid foodstuff mixtures may include one mixture component which imparts its flavor, or several mixture components, imparting the flavors respectively, and a further mixture component intended for the dilution or for the sweetening, or again several such mixture components, respectively, for instance water, concentrated sugar solution and invert sugar dissolved in water.

Therefore, several mixture components are needed for each liquid foodstuff mixture, which components each necessitate a respective expensive portion of the plant for a storing, for a controlling of the mass flow, etc., such that known plants for the production of different liquid foodstuff mixtures consist actually of a plurality of plants which are merely located under the same roof, which are designed and operate completely independent from each other. This means that plant portions, which treat basically mixture components, e.g. in case of beverages water and sugar solution, which must be present in a plurality of the beverages being prepared must be present twofold or in a plurality of numbers, causing correspondingly high procurement and operating costs.

SUMMARY OF THE INVENTION

Here, the invention intends to provide a remedy. The invention, such as characterized in the claims solves the object of providing a plant for continuously preparing at least two different liquid foodstuff mixtures, in which only one single plant portion is needed for the mixture components which is common to the several foodstuff mixtures.

A further object is to provide a plant for a continuous preparing of at least two different liquid foodstuff mixtures which each consist of a mixture of several liquid mixture components and have at least mixture component in common, which plant is adapted to be connected to at least two continuously operating bottling apparatuses for these liquid foodstuff mixtures, which is characterized by a first supply station for at least one mixture component allocated to a first liquid foodstuff mixture, with a first outlet line, by at least one further supply station for a further mixture component allocated to a further liquid foodstuff mixture, with at least one further outlet line, by one single basis component supply station for at least one mixture component allocated in common to all liquid foodstuff mixtures, with at least one outlet line for this mixture component, and by an arrangement of step valves, which allow alternatingly a communicating between the at least first outlet line and the at least one outlet line for the common mixture component, or only between the at least one further outlet line and the at least one outlet line for the common mixture component, in order to allow an alternating intermittent flowing of the at least one first and of the at least one further mixture component at a simultaneous continuous flowing of the mixture components which are allocated in common to both liquid foodstuff mixtures.

The advantages gained by the invention are to be seen substantially in that one single plant portion is allocated simultaneously to a plurality of products to be prepared, such that considerable savings on costs of the procurement and of the maintenance of the complete plant can be arrived at. Although the fed flow of the individual liquid mixtures for the different beverages proceeds intermittent, all bottling apparatuses supplied by the plant structured in accordance with the invention can operate continuously.

BRIEF DESCRIPTION OF THE DRAWINGS

The present invention will more fully be understood by reference to the following detailed description thereof when read in conjunction with the attached drawings; wherein.

METHODS OF EMBODIMENT OF THE INVENTION

Figure 1:
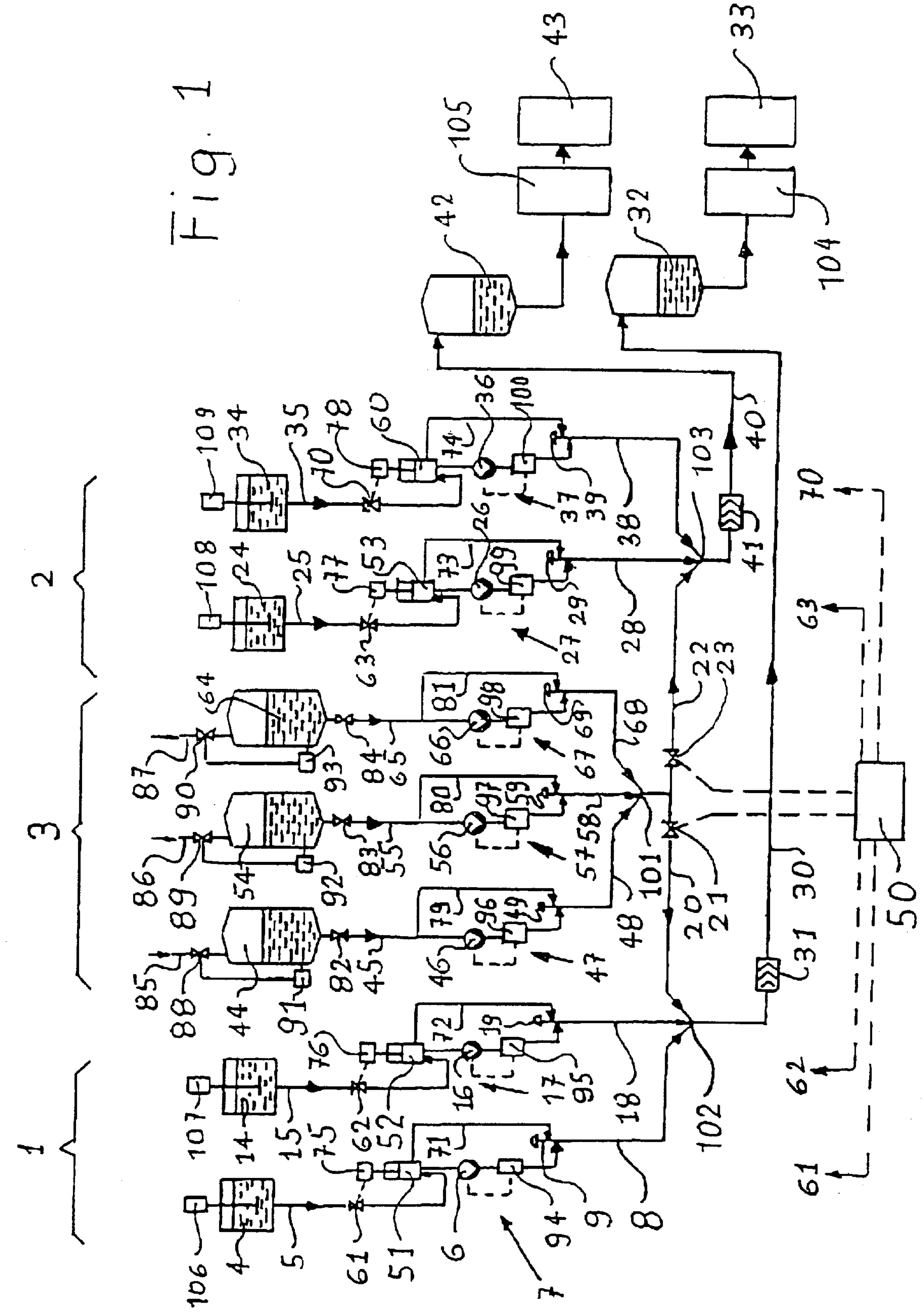
FIG. 1 illustrates schematically and simplified the flow diagram of a plant for the production and bottling of a plurality of beverages.

It shall be noted that the production of beverages is merely an example. The plant may for instance also be used for the production of cream-like products. Also, at least one of the products must not necessarily by a ready to drink beverage. It could be a so-called syrup, which is diluted with water not earlier than immediately prior to the final consumption.

Both illustrated flow diagrams are an example of a plant in which two different beverages are produced. Thereby, each beverage is composed in relation to its flavor of two mixture components. Furthermore, three mixture components are present which are contained in the first beverage and in the second beverage, as well.

Initially, the plant according to FIG. 1 will be described.

The plant includes a first supply station 1 with two first storage containers 4 and 14 with agitators 106 and 107. Each storage container 4 and 14 contains a mixture component for a first beverage. These two differing mixture components determine in their mixed state the flavor, which is typical for the final beverage.

It shall be noticed that according to a further embodiment this first supply station may include only one single storage container in case that only one flavor imparting mixture component is necessary for the final beverage.

A further supply station 2 of the plant includes two further storage containers 24 and 34 with agitators 108 and 109. Each further storage container 24 and 34 contains a further mixture component for a further beverage. These two further differing mixture components determine in their mixed state the flavor, which is typical for the further final beverage.

Also relative to this further supply station 2 it shall be noted that according to further embodiments this supply station 2 may include only one single storage container in case that only one flavor imparting mixture component is necessary for the final beverage.

It is also possible that the supply stations 1 and 2 include three or more storage containers in case that three or more mixture components which differ from each other are needed for the final beverage.

The plant includes, furthermore, a base components supply station 3. At the illustrated embodiment three storage containers 44, 54, 64 are depicted, which means that three different mixture components are present. In analogy to the supply stations 1 and 2, less or also more than three mixture components may be allocated to the basis components supply station 3, thus less or more than three storage containers may be present.

These three different mixture components of the storage containers 44, 54, 64 are now allocated simultaneously to both beverages to be produced. That is, the first beverage is composed of the mixture components of the storage containers 4, 14, 44, 54, 64 and the second beverage is composed of the mixture components of the storage containers 24, 34, 44, 54, 64.

Whereas the mixture components of the storage containers 4, 14 and 24, 34 differ from each other in accordance with the respective beverage and the composition of which is often kept a secret, it is generally known that a concentrated sugar solution, e.g. storage container 44, an invert sugar solution, e.g. storage container 54 and water, e.g. storage container 64 are added to most of the sweet beverages.

Reverting to the first supply station 1 an outflow line 5 is connected to the storage container 4 in which outflow line 5 a shut-off device 61 in form of a stop valve is located. The outflow line 5 extends to a storage vessel 51. The storage vessel is equipped with a level feeler device 75, which at the controlling side is connected among others to the stop valve 61. The storage vessel 51 is followed by a feed pump 6 and a flow meter 94. The devices, i.e. storage vessel 51, feed pump 6, flow meter 94 form together a mass flow control device 7 in order to control and check the fed mass flow and also to basically calibrate the mass flow. The design of this mass flow control device 7 is known and extensively described in the published European patent application EP-A-0 678 735. The flow meter 94 is followed by a switch over valve 9. A recirculation line 71 runs from the switch over valve 9 back to the storage vessel 51 and, furthermore, an outlet line 8 for the mixture component of the storage container 4 extends from the switch over valve 9.

For the second mixture component the first supply station 1 includes a storage container 14, an outflow line 15, a shut off device 62 in form of a stop valve, a storage vessel 52 with a level feeler device 76, with a feed pump 16 and a flow meter 95, such that again a mass flow control device 17 is present, and includes further a switch over valve 19, a recirculation line 72 and an outlet line 18.

The further supply station 2 includes for its first mixture component a storage container 24, an outflow line 25, a shut off device 63 in form of a stop valve, a storage vessel 53 with a level feeler device 77, a feed pump 26 and a flow meter 99, thus a further mass flow control device 27 and, furthermore, a switch over valve 29, a recirculation line 73 and an outlet line 28.

For its second mixture component the further supply station 2 includes a storage container 34, an outflow line 35, a shut off device 70 in form of a stop valve, a storage vessel 60 with a level feeler device 78, a feed pump 36 and the flow meter 100, thus again a mass flow control device 37, and a switch over valve 39, a recirculation line 74 and an outlet line 38.

The stop valves 61, 62, 63 and 70 are connected regarding the control in such a manner to the respective level feeler devices 75, 76, 77 and 78 of the storage vessels 51, 52, 53 and 60, that they may be overridden. This means that in spite the stop valves 61, 62, 63 and 70 are in the open position for a respective operation, a closing of these valves for a short duration may be accomplished by a signal emitted from the level feeler devices 75, 76, 77 and 78 if a maximal allowable liquid level in the storage vessels 51, 52, 53 and 60 is surpassed.

In this example the two supply stations 1, 2 are designed identically regarding the process pattern.

The base components supply station is allocated to the mixture components which are present in the one and in the other beverage, as well. In the illustrated embodiment it is assumed that three such mixture components are present, namely concentrated sugar solution, Invertsugar solution and water.

The base components supply station includes a storage container 44 for a first mixture component and a replenishing line 85. The storage container 44 is equipped with a level feeler 91 by means of which a stop valve 88 located in the replenishing line 85 for the storage container 44 is controlled. The storage container 44 is followed by an outflow line 45 with a further shut off device 82 in form of a stop valve. The outflow line 45 runs to a mass flow control device 47 which includes a feed pump 46 and a flow meter 96. The flow meter 96 is followed by a switch over valve 49. A recirculation line 79 runs from the switch over valve 49 back into the outflow line 45. The switch over valve is, furthermore, followed by an outlet line 48.

A second mixture component which is to be contained in the first and in the second beverage as well, is located in the storage container 54 of the back components supply station 3.

The storage container 54 is equipped with a level feeler 92 by means of which a stop valve 89 located in a replenishing line 86 for the storage container 54 is controlled. The storage container 54 is followed by an outflow line 55, with a further shut off device 83 in form of a stop valve. The outflow line 55 runs to a mass flow control device 57 which includes a feed pump 56 and a flow meter 97. The flow meter 97 is followed by a switch over valve 59. A recirculation line 80 runs from the switch over valve 59 back into the outflow line 55. The switch over valve 59 is, furthermore, followed by an outlet line 58.

A third mixture component which is contained in the first and in the second beverage, as well, is located in the storage container 64 of the base component supply station 3.

This storage container 64 is equipped with a level feeler 93 by means of which a stop valve 90 located in a replenishing line 87 for the storage container 64 is controlled. The storage container 64 is followed by an outflow line 65 with a further shut off device 84 in form of a stop valve. The outflow line 65 runs to a mass flow control device 67 which includes a feed pump and a flow meter 98. The flow meter 98 is followed by a switch over valve 69. A recirculation line 81 runs from the switch over valve 69 back into the outflow line 65. The switch over valve 59 is, furthermore, followed by an outlet line 68.

If one compares the mass flow control devices 7, 17, 27, 37 and recirculation lines 71, 72, 73, 74 of the first and second supply stations 1, 2 with the mass flow control devices 47, 57, 67 and recirculation lines 79, 80, 81 of the base components supply station 3 it be seen, that at the supply stations 1, 2 storage vessels 51, 52, 53, 60 belonging to the mass flow control devices 7, 17, 27, 37 are present, but that at the base components supply station 3 the recirculation lines 79, 80, 81 are led back directly into the outflow lines 45, 55, 65.

However, at every supply station 1, 2, 3 any of the two alternatives is possible.

This means that at the supply stations 1, 2 the embodiment switch the storage vessels 51, 52, 53, 60 must not necessarily be present at their mass flow control devices 7, 17, 27, 37. The circuits can be designed the same as at the supply station 3. Conversely, the mass flow control devices 47, 57, 67 of the supply station 3 may also be provided with storage vessels.

The respective choice between these alternatives depends from the components to be mixed together.

For beverages the relation of the masses of their several flavor determining components must be controlled precisely, otherwise a wrong product is produced.

The supply station 1 includes the two outflow lines 8, 18, the supply station 2 includes the two outlet lines 28, 38 and the base components supply station includes the three outlet lines 48, 58, 68.

The three outlet lines 48, 58, 68 are led together at the point 101 such to communicate with connecting line sections 20, 22.

A first stop valve 21 is located in the first connecting line section 20.

A further stop valve 23 is located in the further connecting line section 22.

The first connecting line section 20 extends from the combined outlet lines 48, 58, 68 to the outlet lines 8, 18 of the first supply station 1 in order to be combined with same at the point 102.

A first transfer line 30 in which a mixer 31 is arranged extends from the point 102 to an intermediate storage vessel 32.

The further connecting line section 22 extends from the combined outlet lines 48, 58, 68 to the outlet lines 28, 38 of the supply station 2 in order to be combined with same at the point 103.

A further transfer line 40 in which a further mixer 41 is arranged extends from the point 103 to a further intermediate storage vessel 42.

The mixing of all components of the respective beverages takes place in the mixers 31 and 41, so that the beverages with the respective precise recipe are located or temporarily stored, resp. in the intermediate storage vessels 32 and 42.

The first intermediate storage vessel 32 can now be connected to a continuously operating bottling apparatus 33 (which does not form a part of the invention) so that the bottling apparatus is continuously supplied with the product.

The reference numeral 104 designates further apparatuses (also forming no part of the plant of the present invention) of the plant, e.g. an apparatus for an adding of $CO_2$ and/or an apparatus for adding additional water.

The second intermediate storage vessel 42 can be connected to a further continuously operating bottling apparatus 43 (not forming part of the invention) so that the bottling apparatus is continuously supplied with the further product.

The reference numeral 105 designates further apparatuses (not forming part of the plant of the present invention, e.g. an apparatus for an adding of $CO_2$ and/or an apparatus for adding additional water.

Now, the operation of this plant will be described.

The operation can be divided into two phases.

The position of the step valves 61, 62 (station 1), 63, 70 (station 2) and of the stop valves 21, 23 in the connecting line sections 20 and 22 are controlled in a timed manner by a control apparatus 50. This control apparatus 50 is obviously only a part of the total controls of the plant.

During a first phase the stop valves 61 and 62 of the station 1 are in their open positions. The switch over valves 9 and 19 are in a position according to which the mixture components which are fed by the operating feed pumps 6, 16 flow from the outflow lines 5, 15 into the outlet lines 8, 18 and thus to the point 102.

The stop valves 82, 83, 84 of the station 3 are also in the open position. The switch over valves 49, 59, 69 are in a position according to which the mixture components which are fed by the operating feed pumps 46, 56, 66 flow from the outflow lines 45, 55, 65 into the outlet lines 48, 58, 68 such to be combined at the point 101.

The stop valve 21 in the connecting line section 20 is in the open position, so that the said three mixture components flow through the connecting line section 20 also to the point 102 in order to be combined with the mixture components flowing in from the outlet lines 8, 18.

The stop valve 23 in the connecting line section 22 is in the closed position.

The entire mixture flows thereafter from the point 102 into the transfer line 30, is completely mixed in the mixer 31 and flows finally into the intermediate storage vessel 32.

The above described apparatuses 104 and 33, thus specifically a bottling apparatus 33 can now be supplied from the intermediate storage vessel 32 with the liquid foodstuff mixture, e.g. a beverage.

The stop valves 63, 70 of the station 2 are in the closed position such that no supply of mixture components from the station 2 takes place.

After a predetermined time a switching over from phase 1 to phase 2 takes place.

During the second phase the stop valves 63 and 70 of the station 2 are in the open position. The switch over valves 29 and 39 are in a position according to which the mixture components which are fed by the running pumps 26, 30 flow from the outflow lines 25, 35 into the outlet lines 28, 38 and accordingly to the point 103.

The stop valves 82, 83, 84 and the switch over valves 49, 59, 69 remain in the same positions as they are during phase 1.

The stop valve 23 in the connecting line section 22 is in the open position, so that the three mixture components flow from the station 3 through the connecting line section 22 also to the point 103 in order to be combined with the mixture components from the outlet lines 28, 38.

The stop valve 21 in the connecting line section 20 is in the closed position.

The entire mixture flows thereafter from the point 103 into the transfer line 40, is completely mixed in the mixer 41 and flows finally into the intermediate storage vessel 42.

The above described apparatuses 105 and 43, thus specifically a bottling apparatus, can now be supplied with the liquid foodstuff mixture, e.g. a beverage.

The two described phases run alternatingly discontinuously.

This means, therefore, that during the first phase the stop valves 21, 61, 62 are open and the stop valves 23, 63, 70 are closed, and that during the second phase the stop valves 23, 63, 70 are open and the stop valves 21, 61, 62 are closed.

The switch over valves 9, 19 of the station 1, the switch over valves 29, 39 of the station 2 and the switch over valves 49, 59, 69 of the station 3 are basically allocated to the control of the mass flow of the respective mixture component.

As example consider the switch over valve 9 of station 1.

The mixture component, i.e. the liquid is fed at a certain mass flow by the pump and is measured by the flow meter 94 which controls the feed produced by the pump 6 (of e.g. national speed).

As long as the actual value measured by the flow meter 94 corresponds to a set rated value, the switch over valve 9 is in a position according to which the outflow line 5 communicates with the outlet line 8. The recirculation line 71 is blocked.

If now, for instance at the start-up of the phase or during the normal operation the actual value does not correspond to the rated value, the switch over valve 9 is switched, so that the outlet line 8 is blocked and a flowing from the outflow line 5 into the recirculation line 71 and back to the storage vessel 51 takes place. At the same time the feed of the pump 6 is controlled to the rated value based on the actual value measured by the flow meter 94. As soon as the rated value is again reached (a procedure which takes maximal a few seconds), the switch over valve 9 switches again back to the normal operation.

This process and the corresponding method, also during the start-up of the plant, is disclosed in the U.S. Pat. No. 4,964,732 and also in the EP-B-1 334 213 and thus is generally known.

At the illustrated embodiment now, storage vessels 51, 52, 53, 60 are present at the station 1 and 2. At the station 3 the recirculation lines 79, 80, 81 run directly back into the outflow lines 45, 55, 65.

Both variants can be applied at all stations, i.e. according to the needed tolerances, the properties of the mixture components and also of the mass flows.

The two described phases operate alternatingly dicscontinuously. This means that when the beverage mixture for the intermediate storage vessel 32 is produced and fed, no beverage mixture is fed into the further intermediate storage vessel 42.

However, the two bottling apparatuses shall operate continuously.

Accordingly, the production output of the plant in accordance with the invention is at least as large as the sum of the bottling capacities of all following bottling apparatuses, inclusive possible idle time during the switching over between the various phases. It is to be noted that the duration of the various phases may differ from each other, for instance if different bottling apparatuses with differing bottling capacities are present. Accordingly, the respective storage volumes of the intermediate storage containers 42 and 43 is set to correspond to the frequency and the duration of the respective phases according to which they are charged, such that they will not run empty in spite of the continuously operating bottling apparatuses 33 and 34.

It can be seen that the inflow of the mixture components from the first supply station 1 and from the further supply station 2 proceeds discontinuously, however that the flow of the mixture components from the base components supply station proceeds continuously. Therefore, during a first time span the mixture components of the base components supply station are brought together with the mixture components of the first supply station 1, and during a second time span the mixture components of the one and the same basis component supply station 3 are brought together with the mixture components of the further supply station 2.

This means that both products to be produced are supplied by the one base components supply station 3, so that these base components supply station of the entire plant must be present only once, wherewith the building costs and also the costs for the maintenance of the plant are considerably lower than in the case of two such base components supply sations 3 such as has been the case until now.

From the described example of the plant it can be seen that the first liquid foodstuff mixture, e.g. a first beverage consists of the two concentrate mixture components of the storage containers 4, 14 and of the "diluting and sweetening, respectively mixture components" of the storage containers 44, 54, 64, and that the further liquid foodstuff mixture, e.g. a further beverage consists of the two concentrate mixture components of the storage vessels 24, 34 and of the "diluting and sweetening, respectively mixture components" of the storage containers 44, 54, 64.

There are, however, also designs in which the two beverages do not contain the same "diluting and sweetening, respectively mixture components".

This means that the first beverage is a mixture of the mixture components of the storage vessels 4, 14, 44 and 54, and the further beverage is a mixture of the mixture components of the storage containers 24, 34, 54 and 64.

Therefore, only the mixture component of the storage container 54 would be allocated simultaneously to both beverages, and this mixture component alone would be the at least one mixture component allocated simultaneously to both liquid foodstuff mixtures.

Figure 2:
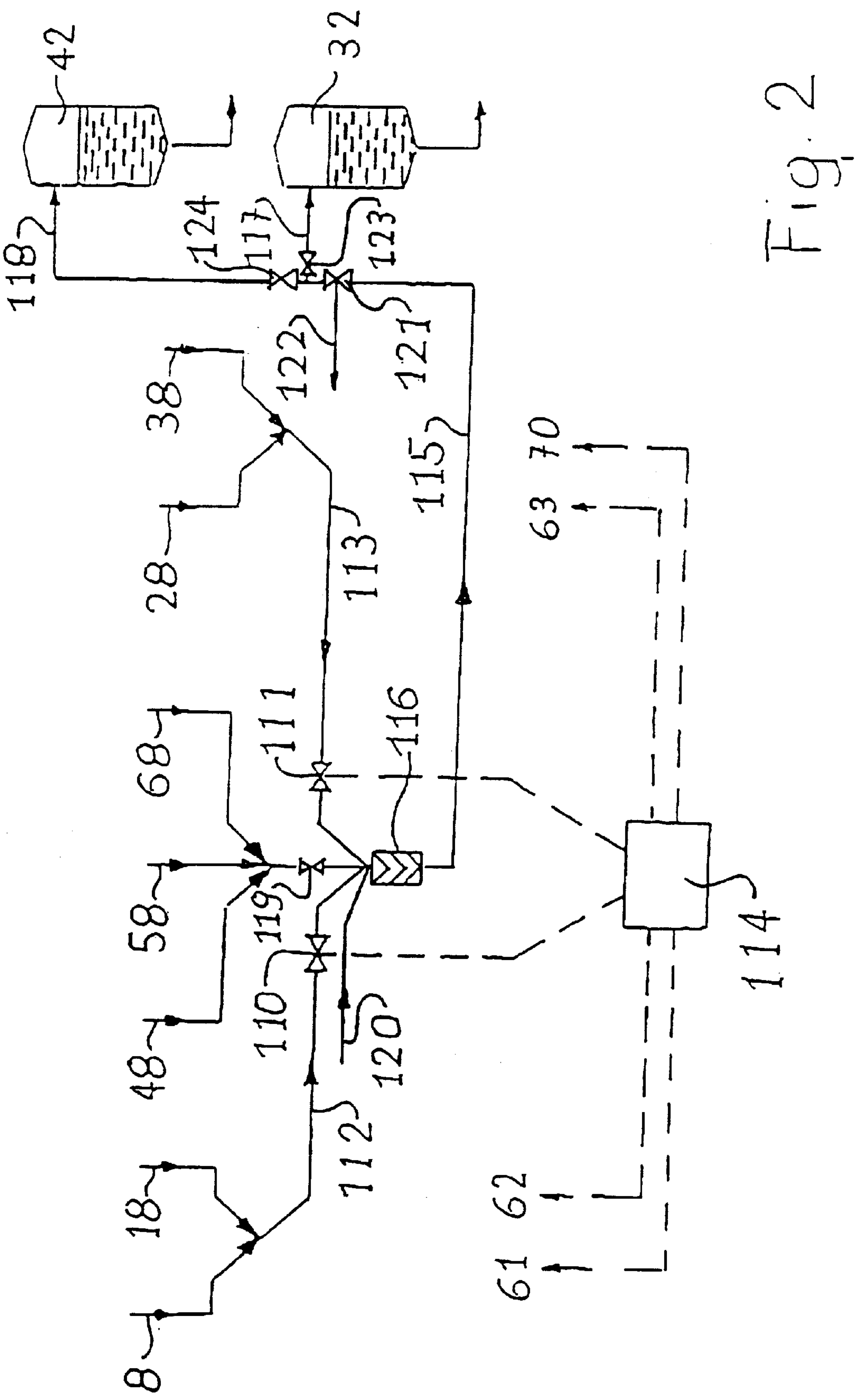
FIG. 2 illustrates a flow diagram of a further embodiment.

FIG. 2 illustrates a further embodiment of the plant of the present invention, whereby only those parts of the plant are illustrated which differ from the embodiment according to FIG. 1.

The two outlet lines 8, 18 of the station 1 are led directly together and continue in a connecting section 112, in which a stop valve 110 is located which is controlled by a control apparatus 114.

The two outlet lines 28, 38 of the station 2 are also led together and continue in a further connecting section 113, in which also a stop valve 111 controlled by the control apparatus 114 is located.

Analogue to the first embodiment this control apparatus controls in a timed manner the stop valves 61, 62 of the station 1 and the stop valves 63, 70.

The three outlet lines 48, 58, 68 of the station 3 are led together like in the first embodiment.

The stop valve 119 does not take part in the process proper of the operating method.

The connecting sections 112 and 113 and the outlet lines 48, 58, 68 communicate directly with one single mixer 116 for both mixtures to be produced. A single transfer line 115, again for both mixtures to be produced, extends from the mixer 116. At its end this transfer line 115 branches into two branch lines 117 and 118 which extend into the corresponding storage vessels 32, 42.

The operation of this second embodiment is the same as the one of the first embodiment.

However, the inflows are controlled by different stop valves. The mode of operation of the stop valves 61, 62 and 63, 70 remains unchanged.

During the first phase, during which an inflow comes from the outlet lines 8, 18 and no inflow comes from the outlet lines 28, 38, the stop valve 110 is in the open position and the stop valve 111 is in the closed position.

During the second phase, during which an inflow comes from the outlet lines 28, 38 and no inflow comes from the outlet lines 8, 18, the stop valve 111 is in the open position and the stop valve 110 is in the closed position.

At this embodiment a rinsing phase occurs during the switching between the two phases. The rinsing medium is one generally known to the person skilled in the art, water, $CO_2$, etc. During the as such short rinsing phase the stop valves 110, 111 and 119 are closed. The rinsing medium (there could be used, such as known to the person skilled in the art, consecutively various different mediums) enters the mixer 110 from the line 120 in order to rinse same, and flows further through the line 115 in order to exit old switch over valve 121 through the line 122.

For the sake of completeness stop valves 123, 124 are illustrated at the lines 117, 118 extending to the storage vessels 32, 42. Depending on the phase these stop valves 123, 124 are open or closed because obviously the respective mixture is allowed only to flow into the storage vessel allocated to this mixture.

The advantage of this second embodiment is substantially that only one mixer 116 must be present. Furthermore, at least a part of the known apparatuses which analyze the respective inflowing mixture regarding the correct composition must be present only once.

Generally, the parts of the plant allocated to the rinsing must always, i.e. here by both embodiments, be present, because any plant must be rinsed from time to time.

"While there is shown and described the preferred embodiment of the invention, it is to be understood that the invention is not to be limited thereto, but may be variously embodied and practiced within the scope of the following claims."

I claim:

1. A system for continuously preparing of at least two different liquid foodstuff mixtures of which each consists of a mixture of several liquid mixture components and includes at least one mixture component which is common to all mixtures, which plant is intended to be connected to at least two continuously operating bottling apparatuses for these liquid foodstuff mixtures, including a first supply station (1) for at least one mixture component allocated to a first liquid foodstuff mixture, with at least one outlet line (8, 18), by at least one further supply station (2) for at least one further mixture component allocated to a further liquid foodstuff mixture, with at least one further outlet line (28, 38), by one single base components supply station (3) for an at least one mixture component allocated simultaneously to both liquid foodstuff mixtures, with at least one outlet line (48, 58, 68) for this mixture component, and by an arrangement of stop valves (21, 23, 110, 111) which allow alternatingly a communicating between said at least one outlet line (8; 18) and the at least one outlet line (48, 58, 68) for the common mixture component, or only between said further outlet line (28, 38) and said at least one outlet line (48, 58, 68) for the common mixture component, in order to allow an alternatingly intermittent flowing of the at least one first and the at least one further mixture component of a simultaneous continuous flowing of the mixture component allocated in common to both liquid foodstuff mixtures.

2. The system of claim 1, wherein the first supply station (1) comprises at least one first storage container (4, 14) for the receipt of one mixture component, to which first storage container (4, 14) a first outflow line (5, 15) which may be shut off by a first shutoff device (61, 62) is connected, which extends to a first mass flow control device (7, 17) having a feed pump (6, 16), onto which the at least one first outlet line (8, 18) is connected, that the at least one further supply station (2) comprises at least one further storage container (24, 34) for the receipt of a further mixture component, to which further storage container (24, 35) a further outflow line (25, 35) which may be shut off by a further shutoff device (63, 70) is connected, which extends to a further mass flow control device (27, 37) having a feed pump (26, 36), onto which the at least further outlet line (28, 38) is connected, and in that the base components supply station (3) comprises at least one base component storage container (44, 54, 64) for the receipt of a mixture component which is common to all liquid foodstuff mixtures, onto which basis component storage container (44, 54, 64) a base components outflow line (45, 55, 65) is connected which may be shut off by a shutoff device (82, 83, 84), which extends to a mass flow control device (47, 57, 67) having a feed pump (46, 56, 66), onto which the base component outlet line (48, 58, 68) is connected.

3. The system of claim 2, wherein a storage vessel (51, 52, 53, 60) and a switch over valve (9, 19, 29, 39) are arranged at the at least one mass flow control device (7, 17, 27, 37) of the first (1) and the further supply station (2), which storage vessel (51, 52, 53, 60) communicated through the outflow line (5, 15, 25, 35) with the corresponding storage container (4, 14, 24, 34), which switch over valve (9, 19, 29, 39) communicates with a recirculation line (71, 72, 73, 74) extending back to the corresponding storage vessel (51, 52, 53, 60) and with the corresponding outlet line (8, 18, 28, 38), and allows in a first position a flowing from the feed pump (6, 16, 26, 36) into the respective recirculation line (71, 72, 73, 74) and blocks the respective outlet line (8, 18, 28, 38), and allows in a second position a flowing from the feed pump (6, 16, 26, 36) into the respective outlet line (8, 18, 28, 38) and blocks the respective recirculation line (71, 72, 73, 74).

4. The system of claim 2, wherein a switch over valve (49, 59, 69) is located at at least one mass flow control device (47, 57, 58) of the base component supply station (3), which switch over valve (49, 59, 69) communicates with a recirculation line (79, 80, 81) extending back to the outflow line (45, 55, 65) and with the corresponding outlet line (48, 58, 68) and in a first position allows a flowing into the respective recirculation line (79, 80, 81) and blocks the respective outlet line, and in a second position allows a flowing into the respective outlet line (48, 58, 68) and blocks the respective recirculation line (79, 80, 81).

5. The system of claim 2, wherein a first connecting line section (20) extending between the at least one outlet line (8, 18) and each base component outlet line (48, 58, 68), communicating with same and blockable by a first one (21) of the stop valves (21, 23, 110, 111), which connecting line section is adapted to transfer each respective mixture component which is common to all liquid foodstuff mixtures, by a further connecting line section (20) extending between the at least one further outlet line (28, 38) and each base component outlet line (48, 58, 68), communicating with same and blockable by a further (23) of the stop valves (21, 23), which connecting line section is adapted to transfer each respective mixture component which is common to all liquid foodstuff mixtures.

6. The system of claim 2, wherein a connecting section (112) extending between the at least one outlet line (8, 18) and each base component outlet line (48, 58, 68), communicating with same and blockable by one (110) of the stop valves (21, 23, 110, 111), which connecting section is adapted to transfer the at least one mixture component to the at least one mixture component allocated to all mixtures and by a connecting section (113) extending between the at least one further outlet line (28, 38) and each base component outlet line (48, 58, 68), communicating with same and blockable by a further one (112) of the stop valves (21, 23, 110, 111), which connecting section is adapted to transfer the at least one further mixture component to the at least one mixture component allocated to all mixtures.

7. The system of claim 5, wherein a control apparatus (50) which communicates control-wise with each first shutoff device (61, 62), the first stop valve (21) each further shutoff device (63, 70) and the further stop valve (23) and is designed in such a manner, that at a first operating position each first shutoff device (61, 62) and each first stop valve (21) are in the open position, each respective further shut off device (63, 70) and the further stop valve are in the closed position, and at a second operating position each first shut off device (61, 62) and each first stop valve (21) are in the closed position and the respective further shut off device (63, 70) and the further stop valve (23) are in the open position, so that during the continuous operation of the plant at a continuous availability of the liquid foodstuff mixture an alternatingly discontinuous flow of liquid flows through the first (30) and through the further transfer line (40), as well.

8. The system of claim 6, wherein a control apparatus (114), which communicates control-wise with each first shut off device (61, 62), a first one (110) of the stop valves (21, 23, 110, 111), each further shut off device (63, 70) and a further one (111) of the stop valves (21, 23, 110, 111) and is designed in such a manner, that at a first operating position each first shut off device (61, 62) and the first one (110) of the stop valves (21, 23, 110, 111) are in the closed position and the respective further shut off device (63, 70) and the further one (111) of the stop valves (21, 23, 110, 111) are in the open position, and in a second operating position each first shut off device and the first one of the stop valves (21, 23, 110, 111) are in the open position and the respective further shut off device (63, 70) and the further one (111) of the stop valves (21, 23, 110, 111) are in the closed position.

9. The system of claim 3, wherein each storage vessel (51, 52, 53, 60) includes at least one level feeling device (75, 76, 77, 78) which communicates with the shut off device (61, 62, 63, 70) of the corresponding outflow line (5, 15, 25, 35) in order to close this shut off device upon a to high liquid level in the corresponding storage vessel (51, 52, 53, 60).

10. The system of claim 5, wherein at least one transfer line (30, 40, 115) which communicates with every outlet line (8, 18, 28, 38) and extends into at least one intermediate storage vessel (32, 42), in which transfer line a mixer (31, 41, 116) is located, and in that the storage volume of the at least one intermediate storage vessel (32, 42) is dimensioned depending from the duration and frequency of the infeed of the flow of liquid allocated thereto with such a large volume that at a discontinuously inflowing flow of liquid of a respective mixture due to the discontinuously opening shut off devices and stop valves a continuous supply of the bottling apparatus (33, 43) following same is ensured.

11. The system of claim 5, wherein a first transfer line (30) which communicates with each outlet line (8, 18) and the first connecting line section (20) and extends into a first intermediate storage vessel (32), in which first transfer line (30) a first mixer (31) is located, and by a further transfer line (40) which communicates with each further outlet line (28, 38) and the second connecting line section (22) and extends into a further intermediate storage vessel (42), in which further transfer line a further mixer (41) is located, and in that the storage volume of each intermediate storage vessel (32, 42) is dimensioned depending on the duration and frequency of the inflow of the flow of liquid allocated thereto with such a large volume, that at a discontinuously inflowing flow of the respective liquid due to the discontinuously opening shut off devices (61, 62, 63, 70) and stop valves (21, 23) a continuous supply of the bottling apparatus following same is ensured.

12. The system of claim 6, wherein a transfer line (115) which communicates with all outlet lines (48, 58, 68) of the third supply station (3) and with the connecting sections (112, 113), in which transfer line (115) one single mixer (116) is located, which transfer line (115) includes branch lines (117, 118) which extend to a respective of the storage vessels (32, 42).

13. The system of claim 2, wherein the first supply station (1) is designed for a plurality of different mixture components allocated to a first beverage and includes accordingly a plurality of storage containers (4, 14), outflow lines (5, 15), mass flow control devices (7, 17) of which each has a feed pump (6, 16), a plurality of switch over valves (9, 19) and a plurality of outlet lines (8, 18), which outlet lines (8, 18) communicate with the connecting line section (20) allocated to the basis component supply station (3) at a point downstream of its stop valve (21).

14. The system of claim 2, wherein the first supply station (1) is designed for a plurality of different mixture components allocated to a first beverage, and the at least one further supply station (2) is designed for a plurality of different mixture components allocated to a further beverage, so that for everyone of this mixture components a storage container (4, 14, 24, 34), an outflow line (5, 15, 25, 35), a mass flow control device (7, 17, 27, 37) including a feed pump (5, 16, 26, 36), a switch over valve (9, 19, 29, 39) and an outlet line (8, 18, 28, 38) are present, and in that the outlet lines (8, 18) of the first mixture components communicate with the first connecting line section (20) allocated to the base components supply station (3) at a point downstream of its stop valve (21), and the outlet lines (28, 38) of the further mixture components communicate with the further connecting line section (22) allocated to the base component supply station (3) of a point downstream of its step valve (23).

15. The system of claim 2, wherein the base component supply station (3) is designed for a plurality of mixture components allocated in common to all beverages and includes accordingly a plurality of storage containers (44, 54, 64) and a plurality of outflow lines (45, 55, 65) with a mass flow control device (47, 57, 67) lack having a feed pump (46, 56, 66) which outflow lines are led together at a point immediately downstream of the switch over valves (49, 59, 69).

* * * * *

UNITED STATES PATENT AND TRADEMARK OFFICE

CERTIFICATE OF CORRECTION

PATENT NO. : 6,280,075 B1
DATED : August 28, 2001
INVENTOR(S) : Angelo Cadeo

It is certified that error appears in the above-identified patent and that said Letters Patent is hereby corrected as shown below:

Title page,
Insert the following:
[30] Foreign Application Priority Data

March 24, 1999 (PCT) .................... IB 99/00499
March 25, 1998 (CH) ...................... 703/98

Signed and Sealed this

Twenty-sixth Day of February, 2002

*Attest:*

JAMES E. ROGAN

*Attesting Officer*

*Director of the United States Patent and Trademark Office*